United States Patent [19]

Lau

[11] Patent Number: 4,883,998
[45] Date of Patent: Nov. 28, 1989

[54] BRUSH GEAR FOR AN ELECTRIC MOTOR

[75] Inventor: James C. Lau, North Point, Hong Kong

[73] Assignee: Johnson Electric Industrial Manufactory, Limited, Chaiwan, Hong Kong

[21] Appl. No.: 45,561

[22] Filed: May 4, 1987

[30] Foreign Application Priority Data

May 2, 1986 [GB] United Kingdom ............... 8610774

[51] Int. Cl.$^4$ ............................................. H02K 13/00
[52] U.S. Cl. ...................................... 310/239; 310/42; 310/89; 310/242
[58] Field of Search ............... 310/239, 240, 241, 242, 310/243, 244, 245, 246, 247, 248, 89, 154, 42, 229, 230; 318/365, 541, 542

[56] References Cited

U.S. PATENT DOCUMENTS

| 3,165,654 | 1/1965 | Mabuchi . | |
|---|---|---|---|
| 3,475,635 | 10/1969 | Mabuchi . | |
| 3,628,075 | 12/1971 | Dafler | 310/239 |
| 4,596,941 | 6/1986 | Kluck | 310/239 |
| 4,638,204 | 1/1987 | Kirchner et al. | 310/239 |

FOREIGN PATENT DOCUMENTS

| 0175993 | 4/1986 | European Pat. Off. . | |
|---|---|---|---|
| 1226702 | 10/1966 | Fed. Rep. of Germany | 310/244 |
| 2708119 | 8/1978 | Fed. Rep. of Germany . | |
| 61-251453 | 11/1986 | Japan . | |
| 2000692 | 7/1970 | United Kingdom | 310/241 |
| 1562986 | 3/1980 | United Kingdom . | |
| 2094561 | 9/1982 | United Kingdom . | |
| 2113924 | 8/1983 | United Kingdom . | |

OTHER PUBLICATIONS

RCA Technical Notes; Brush Support; H. G. Wright; TN No. 262; 06/1959.
Johnson PMDC Series HF210G-Feb., 1986.
Johnson PMDC Series HF113G-Feb., 1986.
Johnson PMDC Series NF110G-Feb., 1986.

Primary Examiner—R. Skudy
Attorney, Agent, or Firm—Fleit, Jacobson, Cohn, Price, Holman & Stern

[57] ABSTRACT

An electric motor has a can-like casing and an end cap. Brushgear is mounted on a frame prior to insertion into the motor. The frame holds the brushes of the brush gear away from a commutator of the motor by means of resilient arms which engage the brush gear. As the frame is inserted into the motor the arms come against a post which bends the arms to disengage them from the brush arms so that the brushes settle onto the commutator.

13 Claims, 2 Drawing Sheets

BRUSH GEAR FOR AN ELECTRIC MOTOR

INTRODUCTION

The present invention relates to brush gear for an electric motor, and in particular to an arrangement which allows the insertion of brush gear into a substantially assembled permanent magnet direct current motor.

BACKGROUND

Brush gear in small electric motors, particularly fractional horsepower permanent magnet direct current motors, typically comprises a carbon brush which is carried on an end of a resilient, electrically conducting arm. The arm is arranged to bias the brush against a commutator on the motor shaft. Typically the brush gear is mounted in an end cap which carries a bearing for the motor shaft and forms a structural part of the motor assembly. Because the brushes are mounted to bias them against the commutator it is necessary to hold the brushes apart and away from the region of the commutator when assembling the end cap on the motor, to avoid damage to the brushes. One way of doing this is to utilise a pair of prongs which hold the brushes apart during assembly and are then removed to release the brushes onto the commutator. However, it is necessary to insert the unsupported end of the motor shaft and commutator past the brushes when assembling the end cap on the motor casing, which may result in accidental damage to the brushes.

SUMMARY OF THE INVENTION

In accordance with a first aspect of the invention there is provided an electric motor having a brush assembly comprising a brush arm for resiliently biassing a brush against a commutator of the motor, the commutator rotating about an axis, and a frame supporting the brush arm, wherein holding means is provided on the frame for holding the brush away from the commutator as the frame is inserted into the motor transversely of said axis, said brush being released to bear against the commutator as the brush is brought into line with the commutator.

In accordance with a second aspect of the invention there is provided an electric motor having a housing, a brush assembly comprising a brush arm for resiliently biassing a brush against a commutator, and a frame supporting the brush arm, wherein holding means is provided on the frame for holding the brush away from the commutator as the frame is inserted into the housing, and release means is provided for automatically releasing the brush onto the commutator as the frame is inserted into the housing.

In accordance with a third aspect of the invention there is provided a method of assembly for an electric motor, comprising mounting a rotor in a housing comprising a casing and an end cap, the rotor being journalled at ends thereof in the housing and end cap for rotation about an axis, the rotor having a commutator, mounting brush gear in a frame and inserting said frame and brush gear into said housing in a direction transverse to said axis, said frame holding said brush gear clear of said commutator as the frame is inserted into the housing.

Other preferred features and advantages will be apparent from the following description and the accompanying claims.

DESCRIPTION OF THE PREFERRED EMBODIMENT

Figure 8:
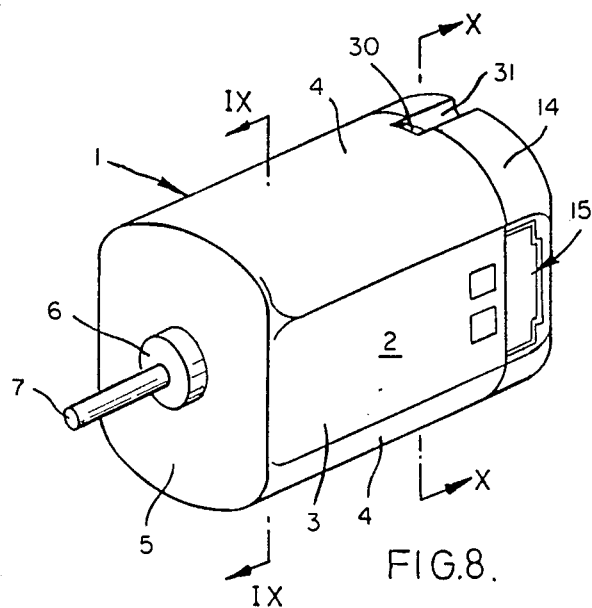
FIG. 8 shows an assembled motor incorporating the cap and frame of FIGS. 1 to 7.

FIG. 8 shows a permanent magnet direct current motor 1 embodying the invention. The motor has a housing comprising a can-like steel casing 1 and a plastic end cap 14. The casing 1 has a pair of opposed planar side walls 3, opposed curved walls 4 and an integrally formed end wall 5. End wall 5 carries a bearing 6 in which an end of a motor shaft 7 is journalled. A plastics end cap 14, which may be moulded, for example, from nylon carries a bearing at its centre to receive the opposite end of shaft 7.

Figure 9:
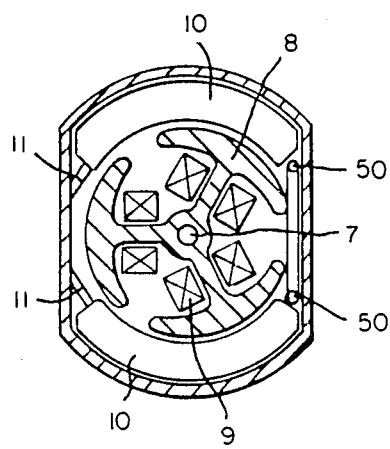
FIG. 9 is a cross-section along the line IX—IX of FIG. 8.

Shaft 7 carries an armature 8 which, in the example shown, has three coils 9 wound about respective arms. Permanent magnet 10 is located inside each curved wall 4 between tangs 11 which are stamped in a side wall 3 and a U shaped spring 50 (FIG. 9). Shaft 7 also carries a commutator 12 (FIG. 10) which is electrically connected to the coils of the armature.

The construction of the motor thus far described is known.

Figure 10:
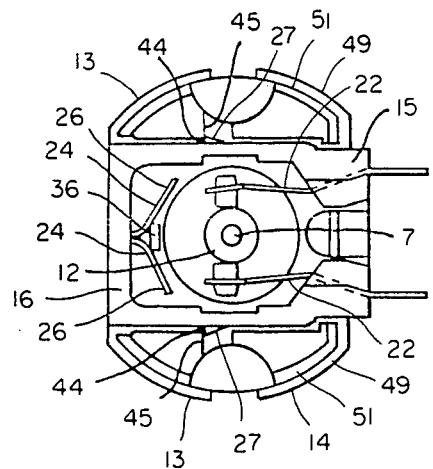
FIG. 10 is a cross-section along the line X—X of FIG. 8.

The invention provides a novel end cap assembly incorporating a frame 15 for holding brush gear which allows the end cap 14 to be attached to the casing 1 before the frame 15 with the brush gear is inserted in the motor. FIG. 10 shows a view of the inside of the end cap 14 with the frame 15 and brush gear in position.

Figure 1:
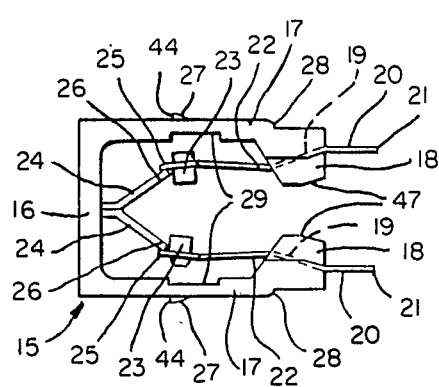
FIG. 1 is a plan view of frame holding brushes for insertion into an electric motor in accordance with invention.
Figure 2:
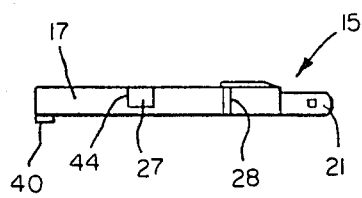
FIG. 2 is a side view of the frame of FIG. 1.
Figure 4:
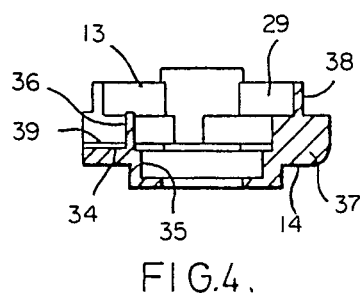
FIG. 4 is a cross-section along the line IV—IV of FIG. 3.

As seen in FIGS. 1 and 2, the frame 15 is of U-shape, moulded of nylon, has an end wall 16 and side walls 17. At the open end of the frame the ends 18 of the side walls 17 are each enlarged and provided with a slot 19 for receiving a brush holder. Brush holder 20 comprises a tang portion 21 for connection to a power supply (not shown) and a resilient arm portion 22 having a brush 23 at its end. The manner of attaching the brush 23 to the arm portion 22 is well known and described in the literature. The arm portion 22 is riveted to the tang 21 and the riveted portions are snugly received in the slots 19. Slots 19 extend deep into the end 18 of the arms walls 17 to allow the ends 18 to flex about the base of the slots to grip the brush holder 20 as the ends are squeezed.

A pair of resilient, curved tabs 24 (holding means) extend out from the end wall 16, and the tips 25 of the brush holders 20 are hooked behind ends 26 of the tabs. As will be described hereinafter, as the frame 15 is slid into the motor end cap 14, the ends 26 of the tabs 24 are urged back against the wall 16 by a post 36 so that the ends 26 are disengaged from the tips of the brush holders, allowing the resilient arm portions 22 to spring back to place the brushes on the commutator (FIG. 10).

A locking, wedge shaped formation 27 is formed on the outside of walls 17 which are also provided with a shoulder 28 for location of the frame 15 in the end cap 14.

Recesses 29 allow the walls 17 to flex readily as the frame is slid home in the end cap and ensure that the brushes 23 do not foul the walls 17.

The brush holders 20 may be fitted in the frame simply by hooking the tips 25 behind the tabs 24 as shown and pushing the holders down into the slots 19 from above.

Figure 3:
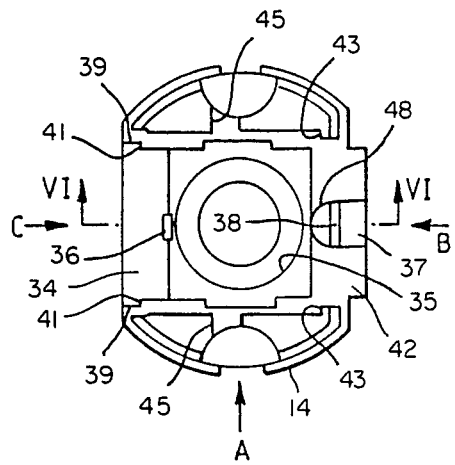
FIG. 3 is a plan view of the inside of an end cap for an electric motor for receiving the frame of FIG. 1.

FIG. 3 is a plan view of the inside of the cap 14. Cap 14 cooperates with the casing 2 to form a channel for receiving the frame 15, the frame being a snug fit between the end of casing 1 and ledges in the end cap. Shoulders 28 and wedge formations 27 cooperate with the end cap to fix the frame 15 in position after it is slid home.

Figure 6:
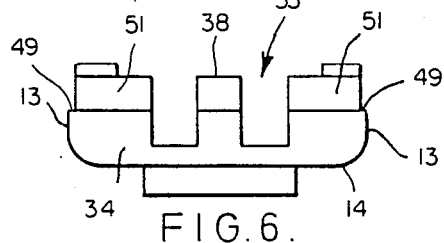
FIG. 6 is a side view on arrow B of FIG. 3.
Figure 5:
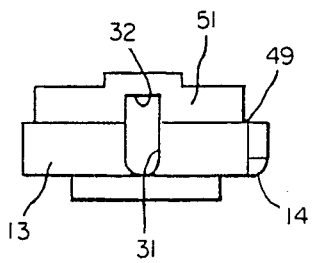
FIG. 5 is a side view of the cap of FIG. 3 on arrow A.

End cap 14 has curved side walls 13 (see FIG. 6) each provided with a shoulder 49. Wall 51 above the shoulders 49 are received in the casing 1, shoulders 49 abutting against the end of the casing. Tangs 30 on the casing are swaged over to engage the base 32 of recesses 31 in the side walls 13 to hold the end cap 14 on the casing 2.

A channel 33 is formed by the side walls 13 and a base 34 of the end cap 14. Base 34 has a circular recess 35 which receives a bearing (not shown) for motor shaft 7.

Projecting up from the base 34 is a post 36 (a release means) against which the centre portions of resilient tabs 24 of frame 15 will abut as the frame is slid home. The ends of tabs 24 will thus be urged backwards to release the brush holders 20. A second post 37 is formed opposite post 36. The ends 18 of the frame 15 are received between post 37 and side walls 13. The gap between the post 37 and side walls 13 is arranged to squeeze slightly the ends 18 to ensure that the brush holders 20 are gripped in the slots 19. Post 37 carries a tongue 38 which fits inside and against a wall 4 of the casing 2.

Figure 7:
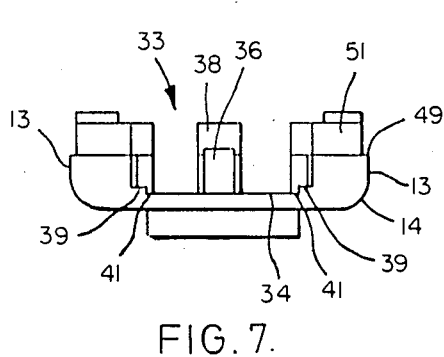
FIG. 7 is a side view on arrow C of FIG. 3.

A ledge 39 is formed at either side of the channel 33 opposite post 36 (FIG. 7). A protrusion 40 on the frame 15 (FIG. 2) sits between the ledges 39 as the frame 15 is slid home in the end cap, the protrusion 40 abutting against shoulders 41. A ledge 42 is provided across the opening adjacent post 37 at the same height as ledge 39.

To assemble the motor of FIG. 8, the rotor and stator assemblies are installed in the casing 2 as generally known, and then the end cap 14 with a bearing in the recess 35 is slid over shaft 7 and attached to the casing 2 by tangs 30.

The frame 15 carrying brush holders 20 is then slid into the opening formed between the end cap and casing on the side of post 36 (the direction of arrow C). The face of the frame as seen in FIG. 1 will face the base surface 34 of the end cap.

As the frame 15 is slid home the protrusion 40 abuts shoulders 41, and the shoulders 28 abut shoulders 43 on the end cap.

The wedge shape formations 27 slide over the inside surfaces of the side walls 13 causing walls 17 to flex inwardly, and the vertical faces 44 of the formations 27 will lock in recesses 45 in the walls 13, as seen in FIG. 10. Also, as the frame is slid home post 36 bears against tabs 24 to release the brush arms and so the brushes 23 to bear on the commutator 12. The inside faces 47 of the ends 18 are chamfered to ride over the curved face 48 of part 37, the ends 18 being gently squeezed.

The frame is therefore held securely against further sliding movement and the brush holders are held in the slots 19 between the frame and the end cap.

It can thus be seen that a mechanism is provided for installing brushes in the motor after the end cap 14 has been attached, avoiding any risk of damage to the brushes as they are slid past the commutator.

Various modifications may be made and it is desired to include all such modifications as fall within the scope of the accompanying claims. For example, tabs 24 may engage the brushes 23. Brushes 23 may be an integral part of arm portions 22, as is generally known in the art.

I claim:

1. An electric motor comprising a housing, a rotor mounted in the housing for rotation about an axis, the rotor having a commutator, a brush assembly having a brush and a brush arm supporting said brush and resiliently biassing the brush against the commutator, and a frame supporting the brush arm, wherein holding means is provided on the frame for holding the brush away from the commutator as the frame is inserted into the motor transversely of said axis, release means being provided to release the brush to bear against the commutator as the frame is inserted in the housing said holding means includes a resilient arm having an end which engages one of said brush arm and said brush to hold the brush away from the commutator, and said release means comprises a stop provided on the housing to contact the arm to urge the arm out of engagement with the said one of said brush arm and brush to release the brush onto the commutator as the frame is inserted in the housing.

2. A motor as claimed in claim 1, wherein the housing comprises a casing and an end cap which is fitted on the casing, said end cap defining at least in part a channel for insertion of said frame.

3. A motor as claimed in claim 2, wherein the channel is defined between the casing and the end cap.

4. A motor as claimed in claim 3, wherein the stop is provided on the end cap.

5. A motor as claimed in claim 4, wherein a shoulder is provided on the housing and the frame abuts against the shoulder to limit the extent of insertion of the frame into the housing.

6. A motor as claimed in claim 5, wherein said frame comprises a resilient arm having a stop, a second shoulder being provided in the housing, said arm flexing to allow said stop to ride over said shoulder as said frame is inserted into the housing.

7. A motor as claimed in claim 2, wherein a slot is provided in the frame and said brush arm is received in the slot, a portion of the frame adjacent the slot being squeezed by said housing when said frame is inserted in the motor.

8. A motor as claimed in claim 7, wherein a pair of brush arms and brushes is provided.

9. A motor as claimed in claim 6, wherein a pair of brush arms and brushes is provided.

10. A motor as claimed in claim 2, wherein said frame comprises a pair of arms, each having a first end supporting a brush arm, and a second end opposite to said first end, said arms being connected together at the second ends.

11. A motor as claimed in claim 10, wherein said holding means is provided at the connection between the arms.

12. A permanent magnet direct current electric motor comprising, in combination:
- a can-like steel casing which is closed at one end and open at an opposite end thereof,
- an end cap mounted on the open end of the casing,
- bearings mounted respectively in the closed casing end and the end cap,
- permanent magnets mounted in the casing,
- a rotor comprising a shaft which is rotatably mounted in the bearings and a commutator and wound armature mounted on the shaft and positioned between the bearings, the commutator being positioned adjacent the end cap,
- the casing and end cap cooperating to define a channel,
- abutment means on said end cap,
- a frame carrying brush gear, the brush gear comprising a pair of resilient brush arms each carrying a brush at one end,
- a pair of tabs on the frame and holding the brushes in spaced apart relationship,
- the frame being slidable into said channel transverse to an axial direction of the shaft,
- the arrangement being such that said tabs abut said abutment means to cause said tabs to release said brushes onto said commutator when said frame is slid into said channel.

13. An electric motor comprising:
- a housing comprising a casing and an end cap mounted on one end of the casing,
- a rotor comprising a shaft which is rotatably mounted in the housing, and a commutator and armature mounted on the shaft,
- the housing defining a channel extending transversely of an axial direction of the shaft and for receiving a frame carrying brush gear,
- a said frame carrying said brush gear, said brush gear comprising a pair of resilient brush arms each carrying a brush and arranged to urge said brushes in a direction towards each other, and holding means on said frame for holding said brushes in spaced apart relationship against the urging of said arms,
- said frame having been slid into said channel transversely to said axial direction of said shaft during assembly of the motor, and said holding means having being caused by abutment means on said housing to release said brush arms as said frame is slid into said channel, so that said brushes bear on said commutator.

* * * * *